(12) United States Patent
Burg et al.

(10) Patent No.: US 9,738,045 B2
(45) Date of Patent: Aug. 22, 2017

(54) APPARATUS FOR FORMING AN ELASTOMERIC STRIP

(71) Applicant: THE GOODYEAR TIRE & RUBBER COMPANY, Akron, OH (US)

(72) Inventors: Gary Robert Burg, Pawlyes Island, SC (US); Christopher David Dyrlund, Canton, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 15/198,483

(22) Filed: Jun. 30, 2016

(65) Prior Publication Data

US 2017/0001397 A1 Jan. 5, 2017

Related U.S. Application Data

(60) Provisional application No. 62/186,699, filed on Jun. 30, 2015.

(51) Int. Cl.
*B29C 47/32* (2006.01)
*B29D 30/30* (2006.01)
*B29K 21/00* (2006.01)
*B29C 47/08* (2006.01)

(52) U.S. Cl.
CPC .......... *B29D 30/30* (2013.01); *B29C 47/0828* (2013.01); *B29C 47/32* (2013.01); *B29D 2030/3078* (2013.01); *B29K 2021/00* (2013.01)

(58) Field of Classification Search
CPC . B29C 47/0021; B29C 47/0828; B29C 47/32; B29C 47/906
See application file for complete search history.

(56) References Cited

U.S. PATENT DOCUMENTS

| | | | | |
|---|---|---|---|---|
| 2,892,212 A | * | 6/1959 | Rhodes | B29C 47/32 425/327 |
| 3,274,645 A | * | 9/1966 | Chase | B29C 47/32 425/170 |
| 3,956,056 A | * | 5/1976 | Boguslawski | B21C 25/02 156/244.11 |
| 4,174,200 A | * | 11/1979 | Hoj | B29C 47/32 425/376.1 |
| 4,927,482 A | | 5/1990 | Capelle | |
| 4,963,207 A | | 10/1990 | Laurent | |
| 4,963,309 A | * | 10/1990 | Gohlisch | B29C 47/0019 264/175 |
| 5,030,079 A | * | 7/1991 | Benzing, II | B29B 17/0005 264/175 |

(Continued)

OTHER PUBLICATIONS

European Search Report dated Nov. 18, 2016 for Application Serial No. EP16175049.

*Primary Examiner* — James Mackey
(74) *Attorney, Agent, or Firm* — June E. Rickey

(57) ABSTRACT

An apparatus for applying a strip of elastomeric material to a surface, the apparatus comprising: a nozzle having an inlet in fluid communication with a pumping means, said nozzle having an upper surface and a lower surface, wherein the lower surface has a curved shape for mating engagement with an outer surface of a rotatable roller, said lower surface having an opening positioned for engagement with the roller outer surface.

6 Claims, 6 Drawing Sheets

(56) References Cited

U.S. PATENT DOCUMENTS

| | | | |
|---|---|---|---|
| 5,122,049 A * | 6/1992 | Baumgarten | B29C 43/24 |
| | | | 264/175 |
| 5,453,238 A * | 9/1995 | Bardy | B29C 47/56 |
| | | | 264/174.11 |
| 6,372,070 B1 | 4/2002 | Iizuka et al. | |
| 6,660,121 B2 * | 12/2003 | Harvey | A44B 18/0049 |
| | | | 156/244.27 |
| 6,821,106 B1 * | 11/2004 | Looman, Jr. | B29C 47/0021 |
| | | | 425/224 |
| 6,834,693 B1 * | 12/2004 | Calvar | B29C 47/064 |
| | | | 152/152.1 |
| 2003/0025238 A1 * | 2/2003 | Ogawa | B29C 47/0019 |
| | | | 264/211.12 |
| 2005/0116374 A1 * | 6/2005 | Ogawa | B29C 66/71 |
| | | | 264/103 |
| 2005/0183810 A1 | 8/2005 | Abe et al. | |
| 2007/0031529 A1 * | 2/2007 | Koch | B29C 47/0014 |
| | | | 425/376.1 |
| 2009/0274786 A1 | 11/2009 | Ougier et al. | |
| 2012/0025430 A1 * | 2/2012 | Testi | B29B 7/005 |
| | | | 264/501 |
| 2013/0020737 A1 | 1/2013 | Ulcej | |

* cited by examiner

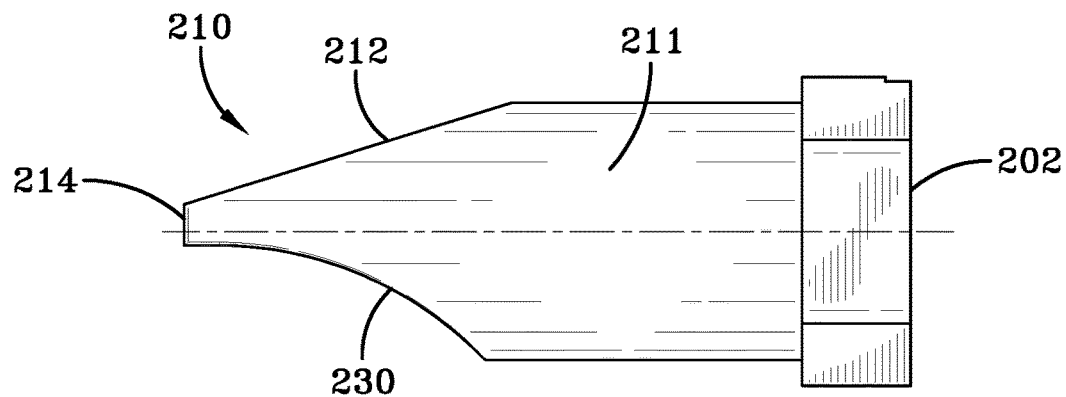
FIG-5
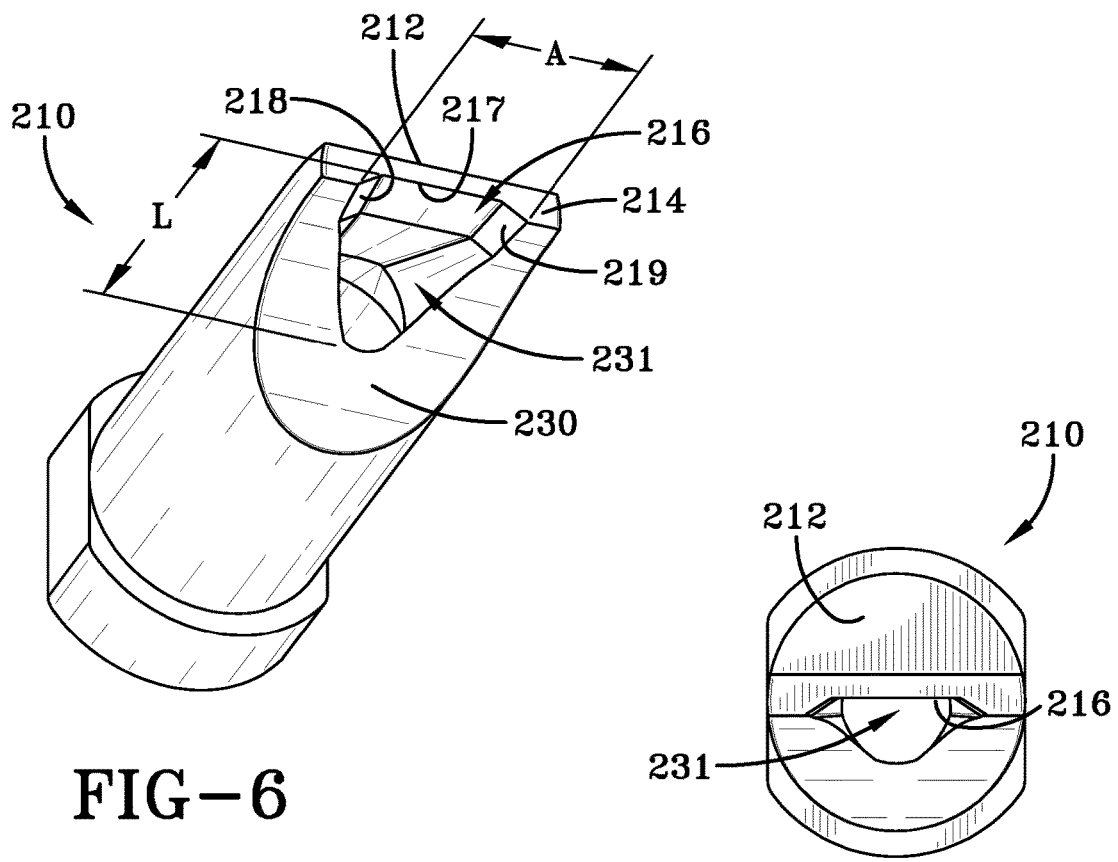
FIG-6
FIG-7

APPARATUS FOR FORMING AN ELASTOMERIC STRIP

TECHNICAL FIELD

This invention relates to an apparatus for forming an elastomeric strip.

BACKGROUND OF THE INVENTION

It is well known in the prior art to manufacture tire components from elastomeric sheets of rubber which are then cut to length with the ends joined together by a lap or butt splice onto a cylindrically shaped building drum. Since the tire components are assembled flat onto a cylindrical tire building drum and then expanded into a toroidal shape, each component has to be placed in tension or compression prior to being molded. This stretching of the various parts causes slippage between the various rubber parts as the components heat up during vulcanization. Attempts to minimize the slippage of the various parts have been attempted. Another disadvantage is that the tire has components which are spliced, wherein the splices contribute to tire nonuniformity.

Tire manufacturers have been increasingly focusing their efforts on eliminating tire nonuniformities. More recently, tire manufacturers are making tire components from a continuous strip of unvulcanized rubber. A thin, narrow strip of unvulcanized rubber is circumferentially wound multiple times onto a rotating drum or toroid shaped core, wherein the strips are successively layered or stacked in order to form the desired shape of the tire component. See for example, U.S. Pat. Nos. 6,372,070 and 4,963,207. The strip of rubber is typically extruded directly onto a tire building drum or toroidal-shaped core using an extruding device. Alternatively the strips may be formed from calendering and then conveyed to the tire drum or core.

This strip lamination method of forming tire components has the advantage of eliminating splices because the annular tire component is typically formed of one continuous strip. Strip lamination has the further advantage of allowing flexibility in manufacturing, since the tire component profile may be changed from tire to tire.

It is known to extrude the rubber through a nozzle or shaping die and to apply the strip of rubber using a roller or stitcher to a tire building drum. However, these systems typically have the disadvantage of causing high pressure and high temperature of the rubber in the system due to the small exit area opening. If the residence time of the rubber is too slow through the system, the rubber may be scorched if the temperature is too high. Thus it is desired to have an improved system which will lower the system temperature and pressure while forming the desired shape of the rubber strip.

DEFINITIONS

"Aspect ratio" of the tire means the ratio of its section height (SH) to its section width (SW);

"Axial" and "axially" means lines or directions that are parallel to the axis of rotation of the tire;

"Bead" means that part of the tire comprising an annular tensile member with or without other reinforcement elements such as flippers, chippers, apexes, toe guards and chafers, to fit the design rim;

"Belt reinforcing structure" means at least two layers of plies of parallel cords, woven or unwoven, underlying the tread, unanchored to the bead, and having both left and right cord angles in the range from 17 degrees to 27 degrees with respect to the equatorial plane of the tire;

"Carcass" means the tire structure apart from the belt structure, tread, under tread, and sidewall rubber over the plies, but including the beads;

"Circumferential" means lines or directions extending along the perimeter of the surface of the annular tread perpendicular to the axial direction;

"Chafers" refers to narrow strips of material placed around the outside of the bead to protect cord plies from the rim, distribute flexing above the rim, and to seal the tire;

"Chippers" means a reinforcement structure located in the bead portion of the tire;

"Cord" means one of the reinforcement strands of which the plies in the tire are comprised;

"Design rim" means a rim having a specified configuration and width. For the purposes of this specification, the design rim and design rim width are as specified by the industry standards in effect in the location in which the tire is made. For example, in the United States, the design rims are as specified by the Tire and Rim Association. In Europe, the rims are as specified in the European Tyre and Rim Technical Organization—Standards Manual and the term design rim means the same as the standard measurement rims. In Japan, the standard organization is The Japan Automobile Tire Manufacturer's Association.

"Equatorial plane" (EP) means the plane perpendicular to the tire's axis of rotation and passing through the center of its tread;

"Footprint" means the contact patch or area of contact of the tire tread with a flat surface at zero speed and under normal load and pressure;

"Innerliner" means the layer or layers of elastomer or other material that form the inside surface of a tubeless tire and that contain the inflating fluid within the tire;

"Net-to-gross ratio" means the ratio of the tire tread rubber that makes contact with the road surface while in the footprint, divided by the area of the tread in the footprint, including non-contacting portions such as grooves;

"Normal rim diameter" means the average diameter of the rim flange at the location where the bead portion of the tire seats;

"Normal inflation pressure" refers to the specific design inflation pressure and load assigned by the appropriate standards organization for the service condition for the tire;

"Normal load" refers to the specific design inflation pressure and load assigned by the appropriate standards organization for the service condition for the tire;

"Ply" means a continuous layer of rubber-coated parallel cords;

"Radial" and "radially" means directions radially toward or away from the axis of rotation of the tire;

"Radial-ply tire" means belted or circumferentially-restricted pneumatic tire in which the ply cords which extend from the bead to bead are laid at cord angles between 65 degrees and 90 degrees with respect to the equatorial plane of the tire;

"Section height" (SH) means the radial distance from the nominal rim diameter to the outer diameter of the tire at its equatorial plane; and, "Section width" (SW) means the maximum linear distance parallel to the axis of the tire and between the exterior of its sidewalls when and after it has been inflated at normal pressure for 24 hours, but unloaded, excluding elevations of the sidewalls due to labeling, decoration or protective bands.

BRIEF DESCRIPTION OF THE DRAWINGS

The invention will be described by way of example and with reference to the accompanying drawings in which:

FIG. 5 is a side view of the nozzle;

FIG. 6 is a perspective view of the nozzle outlet;

FIG. 7 is an end view of the outlet of the nozzle;

DETAILED DESCRIPTION OF THE INVENTION

Figure 8:
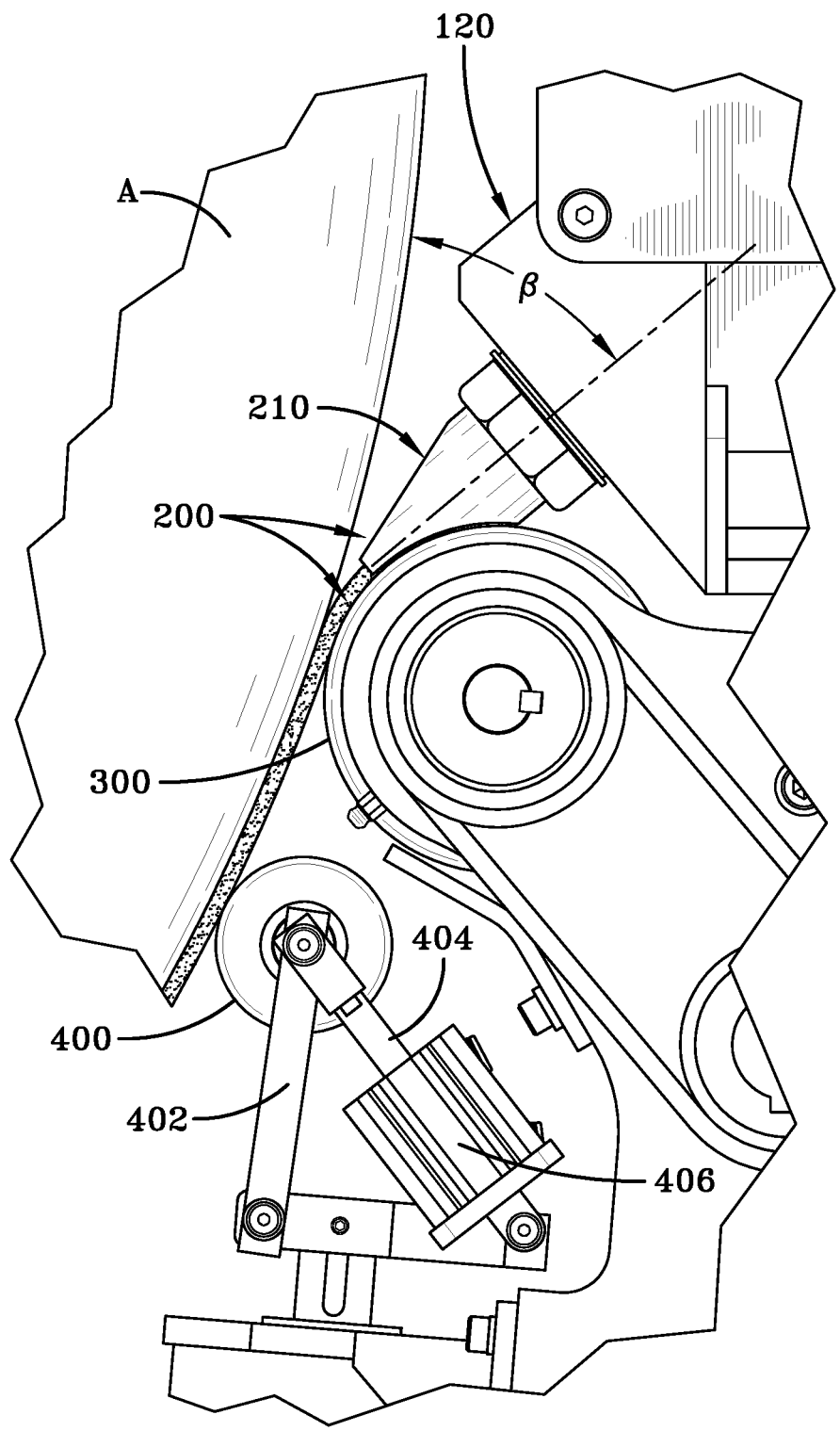
FIG. 8 is a side view of the rubber applicator apparatus shown applying a rubber strip to a tire building drum.

A first embodiment of a rubber applicator apparatus 100 is shown in FIGS. 1-7. The applicator apparatus 100 provides a novel apparatus to form elastomeric tire components quickly and efficiently from a single continuously wound strip or multiple strips of unvulcanized rubber. A continuous strip of unvulcanized rubber may be applied directly onto a tire building surface such as a tire building drum A as shown in FIG. 8, or a toroidal shaped core (not shown).

Figure 1:
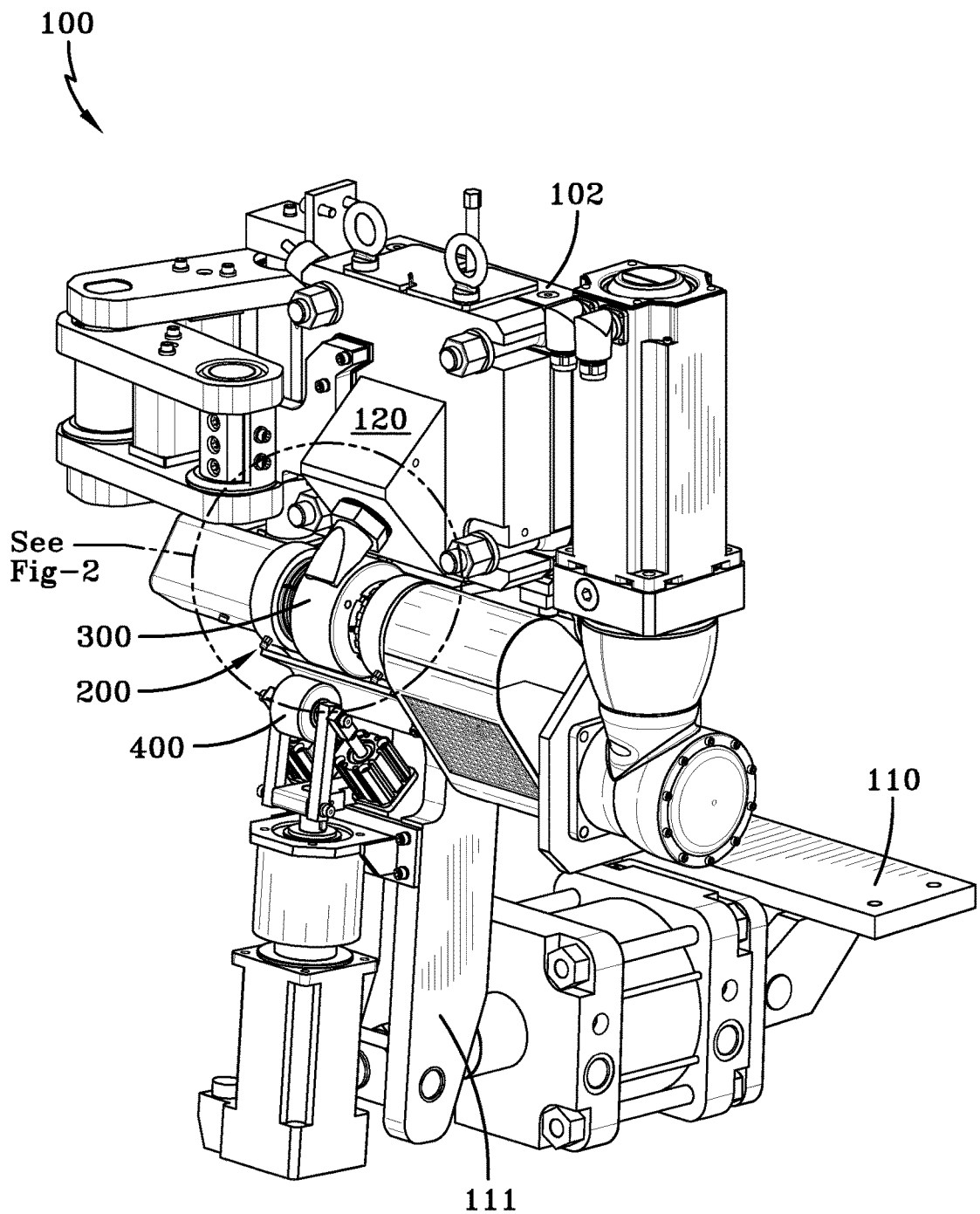
FIG. 1 is a perspective view of a rubber applicator apparatus of the present invention.
Figure 2:
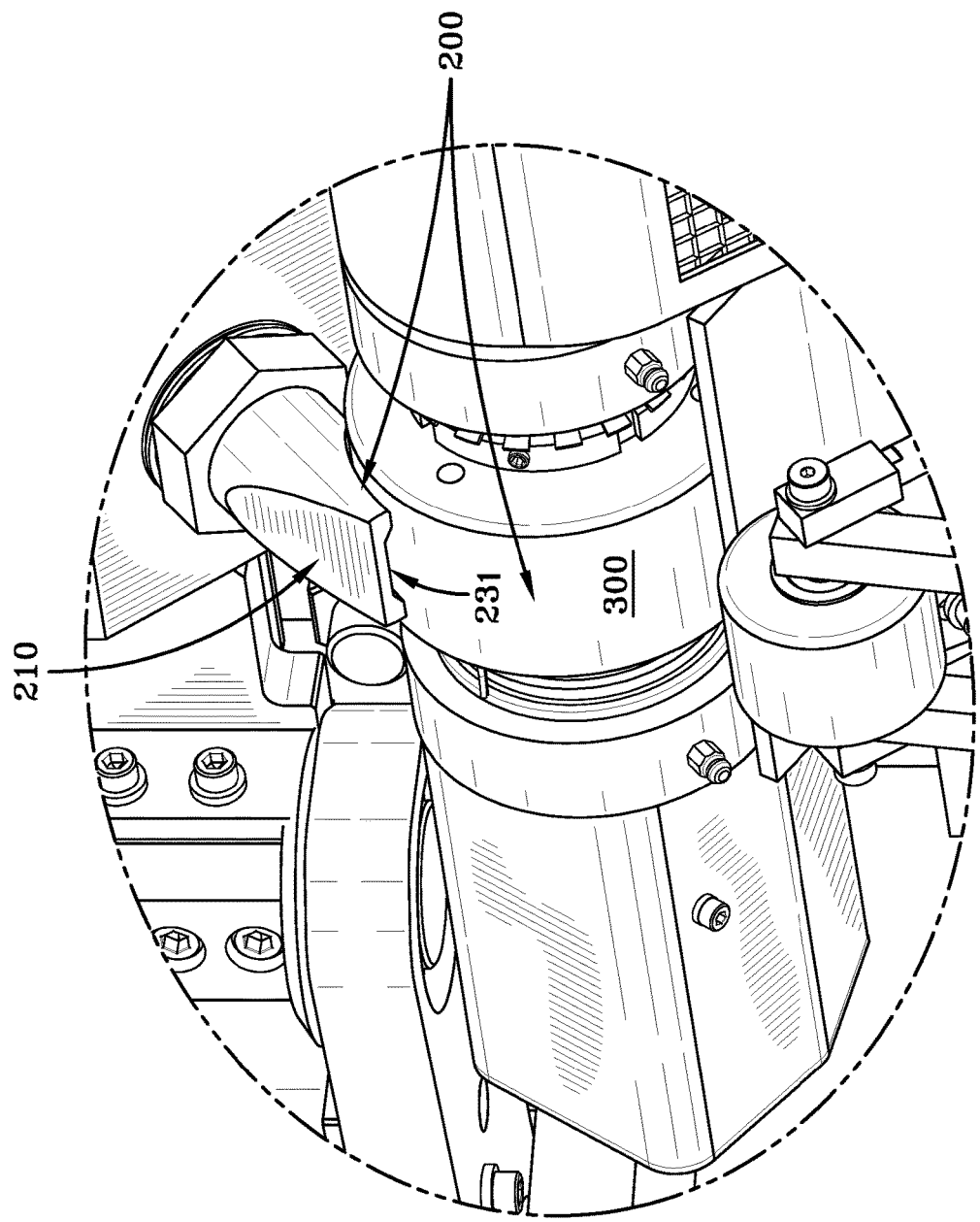
FIG. 2 is a close-up perspective view of a roller and nozzle of the rubber applicator apparatus of the present invention.
Figure 4:
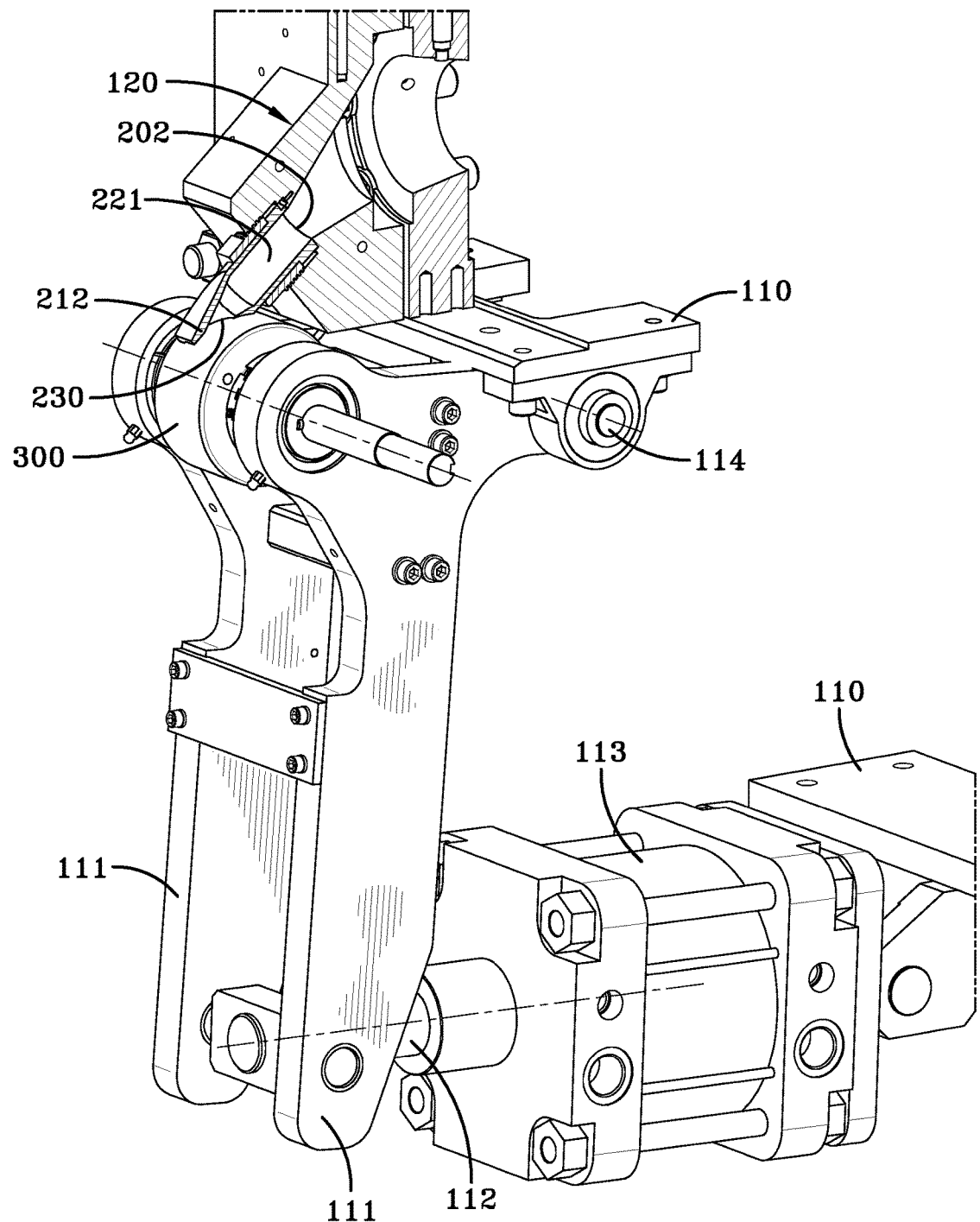
FIG. 4 is a close-up side view of the roller and nozzle wherein the nozzle is shown with half the nozzle removed.

As shown in FIG. 1, the applicator apparatus 100 includes a support frame 110 (parts of which have been removed for clarity), and a roller nozzle 200. The support frame may further include support rails for translating the entire applicator apparatus in the X, Y and Z direction (not shown).). A rotatable linkage 111 is mounted to the support frame 110, and functions to pivot the roller 300 about fixed point 114 as shown in FIG. 4. The rotatable linkage 111 is connected to actuator arm 112 which translates fore and aft to pivot the rotatable linkage 111 about the fixed point 114, so that the roller may likewise be pivoted.

Figure 3:
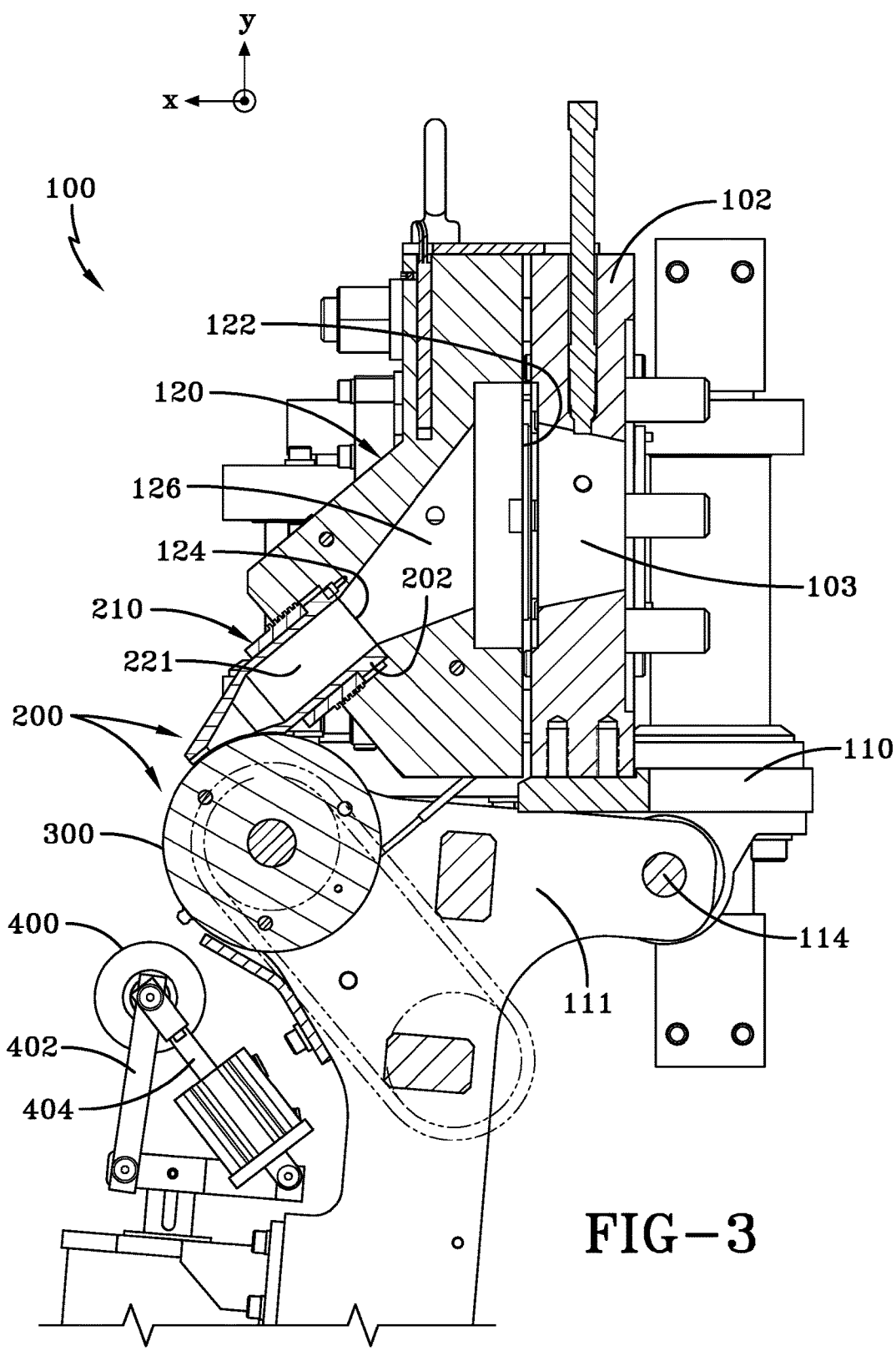
FIG. 3 is a side cross-sectional view of the apparatus of FIG. 1.

As shown in FIG. 3, the support frame 110 includes a mounting flange 102 for connecting to a rubber pumping means such as an extruder, gear pump, extruder-gear pump combination, or rubber injector (not shown). The rubber or elastomer output from the rubber pumping means is fed into an internal passage 103 of the mounting flange and then into a transition member 120. The transition member 120 has an interior channel 126 having an inlet end 122 and an outlet end 124. The inlet end 122 preferably has a larger area than the outlet end 124, resulting in a decreasing area or a funnel-shaped channel 126. Channel 126 is also angled downwardly in the range of about 30 to about 75 degrees with respect to the X axis, more typically about 45-60 degrees. The outlet end 124 of the transition member is connected to an inlet end 202 of a nozzle 210.

The nozzle 210, as best shown in FIGS. 3-7, has a generally cylindrically shaped outer body 211 terminating in an angled face 212 at the nozzle outlet 231. The nozzle has an interior channel 221 that has a decreasing area from the inlet end 202 to the outlet orifice 223 of the nozzle. The angled face 212 of the nozzle terminates in an edge 214. The edge 214 forms a juncture between the angled face 212 and a curved outlet surface 230 of the nozzle. The lower surface of the edge 214 has a shaped die surface 216 that cooperates with the curved outer surface of the roller 300 to form the nozzle outlet 231. The shaped die surface 216 in this example, has a flat edge 217 with opposed beveled ends 218,219 which forms a strip with beveled edges. The die shape is not limited to the configuration shown, and may form other shapes as desired. The curved lower surface 230 of the nozzle is shaped to cooperate with the outer surface of roller 300 in order to form the strip. The lower surface of the nozzle has an outlet 231 that is preferably v shaped. The outlet 231 has an axial width A and a longitudinal length L, wherein the length is preferably greater than 1.5 times the axial width A. The outlet 231 is wide to allow the rubber to engage the outer surface of the roller 300 before exiting the outlet 231. The wide opening allows the rubber or elastomer to engage the outer surface of the roller. As the roller 300 rotates, the outer surface of the roller 300 engages the rubber flowing through the nozzle, and pulls the rubber towards the nozzle outlet 231. The pulling of the rubber by the roller lowers the internal pressure and temperature of the rubber as it travels through the system 100. The lower extrusion temperatures reduce stretch of the rubber. As the rubber is pulled towards the nozzle outlet 231, it is shaped by die surfaces 217,218,219 of the upper edge 214 and the roller outer surface 300. Preferably, the roller 300 is heated.

The outlet die surfaces 217,218,219 of the nozzle is shown with a trapezoidal shape, however other configurations may be used such as, but not limited to, square, rectangular, triangular, etc. The width of the rubber strip output from the nozzle orifice is typically about 15 mm in width, but may vary in the range of about 5 mm to about 30 mm. The nozzle 212 may be optionally heated to a temperature in the range of about 0 to about 200 degrees F. using external or internal heaters (not shown).

As shown in FIG. 8, the nozzle 210 is oriented with respect to the tire building drum A, core (not shown) or other application surface typically at an angle β in the range of about 0 to about 50 degrees, more typically in the range of about 20-35 degrees. The rubber from the nozzle is first adhered to the roller 300, and then pushed through the nozzle outlet and then applied by the rotating roller 300 to the tire building drum A, as shown in FIG. 8. A stitcher roller 400 is positioned adjacent the roller 300, and applies pressure to secure the strip onto the drum. The stitcher roller 400 is attached to link arm 402 that is pivotally connected to the support frame 110. The stitcher roller 400 is connected to actuator arm 404 connected to actuator 406.

The roller assembly 300 preferably has internal heaters for heating the outer surface in the range of about 200 to about 400 degrees F., and more preferably in the range of about 350 to about 400 degrees F. Thus the roller functions as a hot knife, smoothing and smearing the freshly deposited rubber, melting and blending the adjacent strips of rubber together, into a homogeneous mass. The higher roller temperature does not impact the curing of rubber due to the short residence time. The stitcher assembly 400 performs a stitcher function due to the pressure of the roller against the drum, smoothing out the air pockets. The outer surface of the roller also helps shape the formed component.

The roller assembly 300 preferably is connected to a linkage system 111 connected to an air cylinder 113 as shown in FIG. 4, so that the roller 300 may be raised and lowered as linkage arm 112 actuates.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. An apparatus for applying a strip of elastomeric material to a surface, the apparatus comprising:
    a nozzle having an inlet in fluid communication with a pumping means, said nozzle having an upper surface and a lower surface having a nozzle outlet, said nozzle having an interior channel having a portion immediately upstream of the nozzle outlet that decreases in area,
    wherein the lower surface has a curved shape for mating engagement with an outer surface of a rotatable roller, said nozzle outlet being positioned onto the roller outer surface, wherein the roller is pivotally mounted so it can pivot about a fixed point not located in the center of the roller.

2. The apparatus of claim 1 wherein the pumping means is an extruder.

3. The apparatus of claim 1 wherein the pumping means is an extruder in combination with a gear pump.

4. The apparatus of claim 1 wherein the outlet of the nozzle has a V shaped outlet.

5. The roller and nozzle apparatus of claim 1, wherein the outlet of the nozzle further includes a die.

6. The roller and nozzle apparatus of claim 1, wherein the outlet of the nozzle is formed between the roller outer surface and the curved surface of the nozzle.

* * * * *